(12) United States Patent
Lim et al.

(10) Patent No.: US 9,350,925 B2
(45) Date of Patent: May 24, 2016

(54) IMAGE PROCESSING APPARATUS AND METHOD

(71) Applicant: SAMSUNG ELECTRONICS CO., LTD., Suwon-si, Gyeonggi-do (KR)

(72) Inventors: Hwa Sup Lim, Hwaseong-si (KR); Byong Min Kang, Yongin-si (KR); Yong Sun Kim, Daejeon (KR); Kee Chang Lee, Yongin-si (KR); Ouk Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 460 days.

(21) Appl. No.: 13/659,612

(22) Filed: Oct. 24, 2012

(65) Prior Publication Data

US 2013/0107005 A1 May 2, 2013

(30) Foreign Application Priority Data

Nov. 2, 2011 (KR) ........................ 10-2011-0113477

(51) Int. Cl.
*H04N 13/02* (2006.01)
*H04N 5/33* (2006.01)

(52) U.S. Cl.
CPC ............. *H04N 5/33* (2013.01); *H04N 13/0214* (2013.01); *H04N 13/0253* (2013.01); *H04N 13/0271* (2013.01)

(58) Field of Classification Search
CPC . H04N 5/2226; H04N 13/00; H04N 13/0018; H04N 13/0022; H04N 2013/0081; H04N 13/025; H04N 13/0271; H04N 13/0495; H04N 2213/003; H04N 2213/005; H04N 5/33; H04N 13/0253; H04N 13/0214; H04N 13/0239; H04N 13/0246; G06T 7/0051; G06T 7/0075; G06T 7/002
USPC ............................ 348/46; 382/154; 345/421
See application file for complete search history.

(56) References Cited

U.S. PATENT DOCUMENTS

| | | | |
|---|---|---|---|
| 7,295,697 | B1 | 11/2007 | Satoh |
| 2006/0241371 | A1 | 10/2006 | Rafii et al. |
| 2007/0201859 | A1* | 8/2007 | Sarrat ................... G03B 35/08 396/322 |
| 2009/0067707 | A1* | 3/2009 | Sim et al. ....................... 382/154 |
| 2009/0190007 | A1 | 7/2009 | Oggier et al. |
| 2010/0789581 | | 4/2010 | Russell et al. |
| 2010/0239187 | A1 | 9/2010 | Yea et al. |
| 2010/0315490 | A1 | 12/2010 | Kim et al. |
| 2011/0050853 | A1* | 3/2011 | Zhang .................. H04N 13/026 348/44 |

(Continued)

FOREIGN PATENT DOCUMENTS

| | | |
|---|---|---|
| KR | 10-2005-0058085 | 6/2005 |
| KR | 10-2008-0102826 | 11/2008 |

(Continued)

*Primary Examiner* — Sath V Perungavoor
*Assistant Examiner* — Xiaolan Xu
(74) *Attorney, Agent, or Firm* — Harness, Dickey & Pierce, P.L.C.

(57) ABSTRACT

An image processing apparatus may include a sensor unit which generates both a color image and a depth image. A color-depth time difference correcting unit may correct a mismatching that occurs due to a time difference between a point in time when the color image is generated and a point in time when the depth image is generated. An image generator may generate a stereoscopic image or a multi-view image using the color image and the depth image after the mismatching is corrected.

23 Claims, 9 Drawing Sheets

(56) References Cited

U.S. PATENT DOCUMENTS

2011/0254841 A1* 10/2011 Lim et al. .................. 345/421
2011/0286661 A1* 11/2011 Lee et al. .................. 382/154

FOREIGN PATENT DOCUMENTS

| KR | 10-2009-0027003 | 3/2009 |
|----|-----------------|--------|
| KR | 10-2010-0064031 | 6/2010 |
| KR | 10-2010-0085675 | 7/2010 |
| KR | 10-2010-0122988 | 11/2010 |
| KR | 10-2010-0134403 | 12/2010 |
| KR | 10-2011-0024242 | 3/2011 |
| KR | 10-2011-0036757 | 4/2011 |
| KR | 10-2011-0044862 | 5/2011 |
| KR | 10-2011-0049383 | 5/2011 |
| KR | 10-2011-0062993 | 6/2011 |
| KR | 10-2011-0085785 | 7/2011 |

* cited by examiner

IMAGE PROCESSING APPARATUS AND METHOD

CROSS-REFERENCE TO RELATED APPLICATIONS

This application claims the priority benefit of Korean Patent Application No. 10-2011-0113477, filed on Nov. 2, 2011, in the Korean Intellectual Property Office, the disclosure of which is incorporated herein by reference.

BACKGROUND

1. Field

Disclosed herein are embodiments which relate to an image processing apparatus and method for obtaining a three-dimensional (3D) image, and more particularly, to an image signal processor (ISP) used during a process of obtaining a depth image and a color image and a method of operating the ISP.

2. Description of the Related Art

Currently, there is an increasing interest regarding three-dimensional (3D) imagery. There has been conducted research on a color and depth camera that captures a color image and a depth image with respect to an actual target in order to generate the 3D image.

A method of obtaining a depth image may include a 3D scanning method. However, in aspects of portability and utility, it may be advantageous to use a depth camera using an infrared (IR) light. Therefore, it may be possible to obtain a precise depth image using the depth camera, and to obtain 3D information associated with an object using the depth image and a color image that is obtained by a color camera.

As described above, the depth image and the color image may be obtained using the depth camera and the color camera, respectively, and then be matched or mapped with each other. Attempts have been made to obtain the depth image and the color image using a single camera.

However, there is a desire to precisely match a depth image and a color image that are obtained in association with the same object.

SUMMARY

The foregoing and/or other aspects are achieved by providing an image processing apparatus, including: a sensor unit to generate a color image and a depth image; a color-depth time difference correcting unit to correct a mismatching that occurs due to a time difference between a point in time when the color image is generated and a point in time when the depth image is generated; and an image generator to generate a three-dimensional (3D) image using the color image and the depth image in which the mismatching is corrected.

The image processing apparatus may further include a high precision unit to enhance the quality of the depth image by performing at least one preprocessing process which may include a noise cancellation of the depth image, a hole filling of the depth image, or a depth folding removal of the depth image.

The high precision unit may use color image information when enhancing the quality of the depth image.

The image processing apparatus may further include a resolution matching unit to adjust a resolution of the depth image in which the mismatching is corrected to be substantially identical to a resolution of the color image.

The color-depth time difference correcting unit may correct the mismatching by generating a new depth image corresponding to a frame in which the color image is generated, using a reference depth image corresponding to a previous frame or a subsequent frame of a frame in which the depth image is generated.

The color-depth time difference correcting unit may remove a blur occurring due to a motion of the image processing apparatus or an object by performing a phase analysis of the depth image.

The foregoing and/or other aspects may be achieved by providing an image processing apparatus, including: a color sensor unit to generate a color image; a depth sensor unit to generate a depth image; and a view correcting unit to match a view between the depth image and the color image based on a view difference between the color sensor unit and the depth sensor unit.

The image processing apparatus may further include a color-depth time difference correcting unit to correct a mismatching that occurs due to a time difference between a point in time when the color image is generated and a point in time when the depth image is generated.

The foregoing and/or other aspects are achieved by providing an image processing method, including: generating, by a sensor unit, a color image and a depth image; correcting, by a color-depth time difference correcting unit, a mismatching that occurs due to a time difference between a point in time when the color image is generated and a point in time when the depth image is generated; and generating, by an image generator, a 3D image using the color image and the depth image in which the mismatching is corrected.

The foregoing and/or other aspects are achieved by providing an image processing method, including: generating, by a color sensor unit, a color image; generating, by a depth sensor unit, a depth image; and matching, by a view correcting unit, a view between the depth image and the color image based on a view difference between the color sensor unit and the depth sensor unit.

The image processing method may further include correcting, by a color-depth time difference correcting unit, a mismatching that occurs due to a time difference between a point in time when the color image is generated and a point in time when the depth image is generated.

The embodiments may include an image processing apparatus and method that may efficiently overcome a mismatching between a depth image and a color image when the depth image and the color image are obtained using a single camera.

The embodiments may also include an image processing apparatus and method that may obtain 3D information having the enhanced quality by correcting a mismatching of a time of release and/or minute mismatching of a view between a depth image and a color image, and the like.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
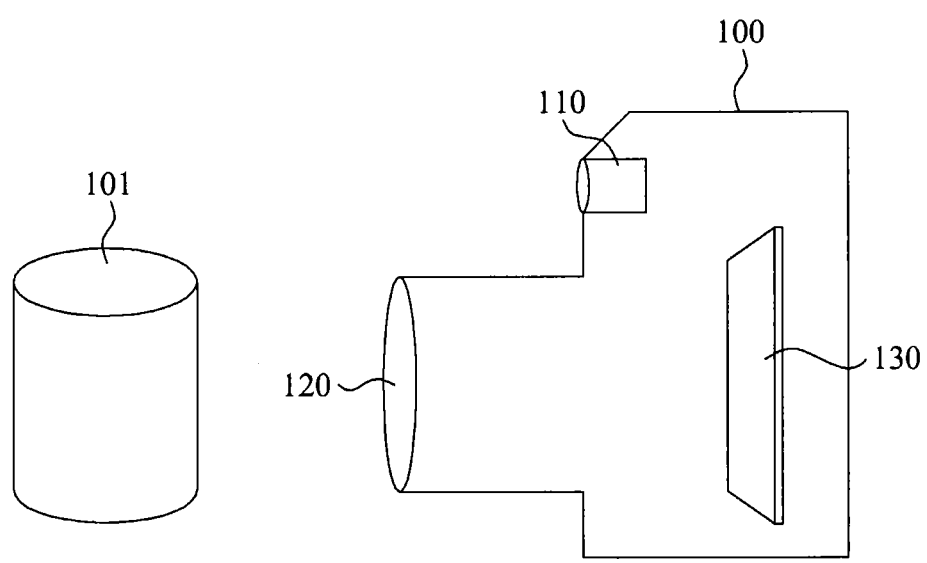
FIG. 1 illustrates an image processing apparatus corresponding to a camera using a 1-lens 1-sensor scheme according to an embodiment.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an image processing apparatus 100 corresponding to a camera using a 1-lens 1-sensor scheme according to an embodiment.

Referring to FIG. 1, the image processing apparatus 100 may obtain a color image and a depth image by capturing an object 101, and may include a sensor unit 130 having a photosensitive characteristic to both a visible light and an infrared (IR) light.

The sensor unit 130 may generate an electrical signal corresponding to a color value using a visible light received from the object 101 via a lens 120. Also, the sensor unit 130 may generate an electrical signal used to calculate a depth value using an IR light that is emitted from an IR emitter 110 and is reflected from the object 101.

According to an embodiment, an internal structure of the sensor unit 130 may follow various types of structures of depth and color sensors generally used. For ease of description, among pixels included in the sensor unit 130, a pixel used to calculate a depth value may be referred to as a depth pixel and a pixel used to generate a color value may be referred to as a color pixel.

As one example of arranging pixels included in the sensor unit 130, color pixels and depth pixels may be alternately arranged on the sensor unit 130. This scheme may be referred to as a space division scheme. When the color pixels and the depth pixels are all included using the space division scheme, the sensor unit 130 may also be referred to as a space division sensor.

According to another embodiment, each of at least a portion of pixels included in the sensor unit 130 may perform functionalities of both a color pixel and a depth pixel and thereby contribute to both a depth value calculation and a color value generation. In the present embodiment, a color image may be captured once and a depth image may be captured once, alternately, by varying a time of release, which may be referred to as a time division scheme. When the color image and the depth image are obtained by varying the time of release using the time division scheme, the sensor unit 130 may also be referred to as a time division sensor.

Hereinafter, structures and operations of an image processing apparatus according to embodiments will be further described.

Figure 2:
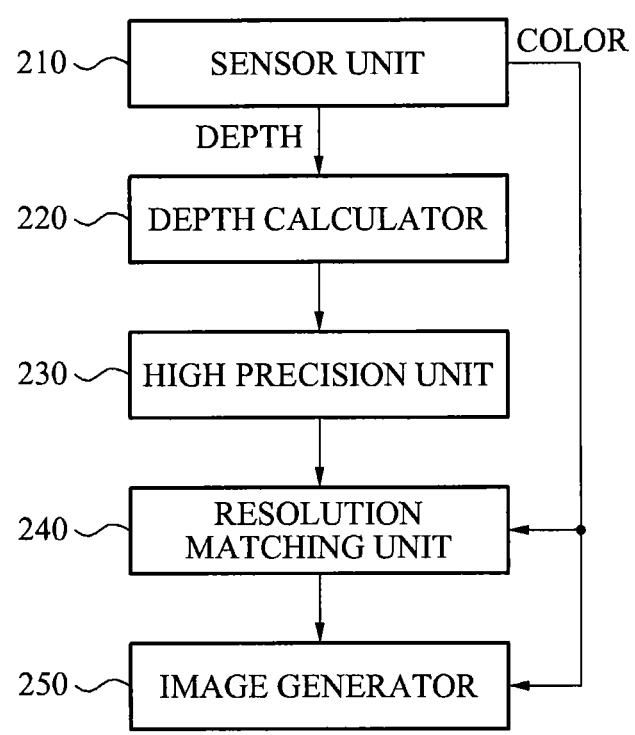
FIG. 2 illustrates an image processing apparatus corresponding to a camera structure in which a sensor unit of the image processing apparatus is spatially divided to obtain a color image and a depth image according to an embodiment.
Figure 3:
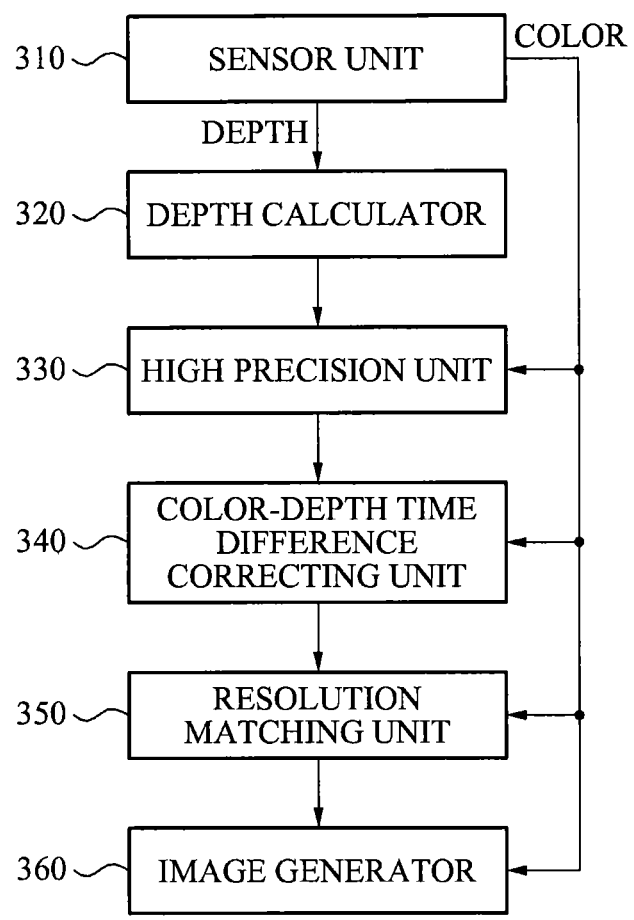
FIG. 3 illustrates an image processing apparatus corresponding to a camera structure in which pixels included in a sensor unit of the image processing apparatus obtain a depth image and a color image by varying a capturing timing according to an embodiment.

FIG. 2 illustrates the image processing apparatus 100 when the sensor unit 130 is configured as the space division sensor, and FIG. 3 illustrates the image processing apparatus 100 when the sensor unit 130 is configured as the time division sensor.

FIG. 2 illustrates an image processing apparatus corresponding to a camera structure in which a sensor unit 210 of the image processing apparatus is spatially divided to obtain a color image and a depth image according to an embodiment.

When the sensor unit 210 provides depth information corresponding to an IR light using the IR light, a depth calculator 220 may generate the depth image.

Description and embodiments related to a specific configuration of the depth calculator 220 will be further described with reference to FIG. 4 and FIG. 5.

A high precision unit 230 may enhance the quality of the depth image by performing various processing of a raw depth image calculated by the depth calculator 220.

The high precision unit 230 may perform processing, for example, reducing or cancelling noise of the depth image, removing a depth folding, and/or removing an artifact such as a hole filling, and the like.

According to embodiments, a median filter, a bilateral filter, and the like may be applied during the above process.

According to embodiments, the quality of the depth image may be enhanced by additionally obtaining an intensity image and employing the obtained intensity image.

By referring to the color image provided by the sensor unit 210, it is possible to enhance the quality, for example, removal of the depth folding in the depth image, removal of an artifact, and the like.

When the high precision unit 230 enhances the quality of the depth image, a resolution matching unit 240 may match a resolution of the color image and a resolution of the depth image.

In general, the resolution of the depth image is less than the resolution of the color image and thus, the resolution matching unit 240 may adjust the resolution of the depth image to match or substantially match the resolution of the color image through up-scaling.

When the quality of the depth image is enhanced and the resolution of the color image and the resolution of the depth image are adjusted to be identical to each other, an image generator 250 may generate a three-dimensional (3D) image.

The 3D image generation may include configuring a 3D model, or may further include directly generating a stereoscopic image or a multi-view image.

The present embodiment assumes that color pixels and depth pixels are arranged within the same sensor unit 210 and there is no view difference between the color pixels and the depth pixels. However, when a view adjustment is required for any reason, the view adjustment may be selectively performed.

The color image generated by the sensor unit 210 may be used even in the high precision unit 230 and the resolution matching unit 240, thereby enhancing the respective processing results.

FIG. 3 illustrates an image processing apparatus corresponding to a camera structure in which pixels included in a sensor unit 310 of the image processing apparatus obtain a depth image and a color image by varying a capturing timing according to an embodiment.

The sensor unit 310 may alternately obtain the depth image and the color image. Accordingly, the sensor unit 310 may alternately obtain the depth image and the color image over time.

A process of generating, by a depth calculator 320, a raw depth image using depth information measured by the sensor unit 310 and a process of enhancing, by a high precision unit 320, the quality of the raw depth image may be the same as the space division scheme described above with reference to FIG. 2.

However, unlike the space division scheme of FIG. 2, in the time division scheme, a point in time when the depth image is generated may be different from a point in time when the color image is generated. Therefore, unless a static and stable camera captures a static object, a mismatching may occur due to a time difference between the depth image and the color image.

Therefore, in the present embodiment, a color-depth time difference correcting unit 340 may correct the time difference based on a difference between the point in time when the depth image is captured and the point in time when the color image is captured. An operation of the color-depth time difference correcting unit 340 will be further described with reference to FIG. 6 and FIG. 7.

When the color-depth time difference correcting unit 340 corrects the time difference based on the difference between the point in time when the depth image is captured and the point in time when the color image is captured, a resolution matching unit 350 may correct a resolution mismatching between the depth image and the color image. The above content is the same as the description made with reference to FIG. 2. An embodiment of matching a low resolution depth image and a high resolution color image through up-scaling may be provided.

When the depth image and the color image are matched by the image processing apparatus, an image generator 360 may perform 3D modeling or may generate a stereoscopic view or a multi-view image.

As described above with reference to FIG. 2, the color image generated by the sensor unit 310 may be used for the high precision unit 330, the color-depth time difference correcting unit 340, and the resolution matching unit 350, thereby enhancing the respective processing results.

A configuration and an operation of the depth calculator 220 of FIG. 2 and the depth calculator 320 of FIG. 3 will be described with reference to FIG. 4 and FIG. 5.

Figure 4:
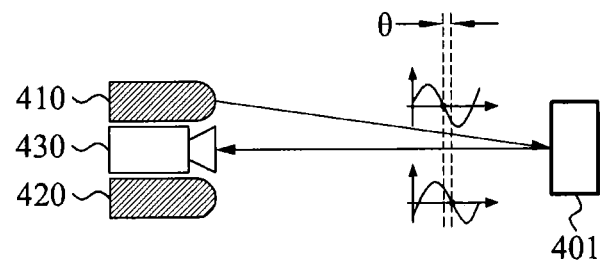
FIG. 4 illustrates a diagram to describe a process of calculating, by a depth calculator, a depth value using a time of flight (TOF) according to an embodiment.

FIG. 4 illustrates a diagram to describe a process of calculating, by a depth calculator, a depth value using a time of flight (TOF) according to an embodiment.

An object 401 may reflect an IR light of a predetermined wavelength emitted from an IR emitter 410 or IR emitter 420, and the reflected IR light may be received by a sensor unit 430.

For example, the IR light that is emitted from the IR emitter 410 and the reflected IR light that is reflected from the object 401 may have the same wavelength and phase difference θ.

The sensor unit 430 may calculate a distance between the sensor unit 430 and the object 401 using the phase difference θ. Specifically, since a position of the sensor unit 430 is different from a position of the IR emitter 410, the distance calculated using the phase difference θ may be greater than a distance between the sensor unit 430 and the object 401. However, the above error may be ignored by setting the distance between the sensor unit 430 and the IR emitter 410 to be sufficiently less than the distance between the sensor unit 430 and the object 401. Depending on necessity, it is possible to compensate for the error.

According to an embodiment, a plurality of light emitters 410, 420 which emit a synchronized IR light having no phase difference may be provided to enhance the intensity of IR light and to complement a directivity error that may occur due to a position of a light emitter.

The sensor unit 430 may generate the depth image by calculating distances between the object 401 and respective portions of a space within an angle of view using the phase difference θ.

Figure 5:
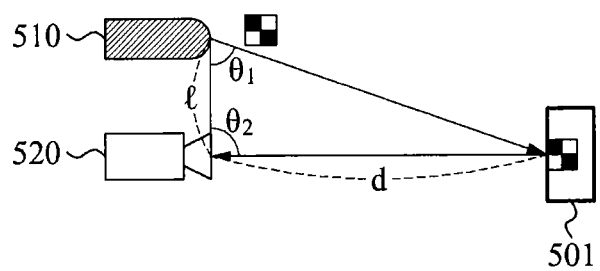
FIG. 5 illustrates a diagram to describe a process of calculating, by a depth calculator, a depth value using a structured light according to an embodiment.

FIG. 5 illustrates a diagram to describe a process of calculating, by a depth calculator, a depth value using a structured light according to an embodiment.

Even in the case of a method of calculating a depth value using the structured light, at least two embodiments may be applied with respect to a method of emitting, by an IR emitter 510, a coded pattern.

In one embodiment the generation of different IR patterns according to a progress direction of an IR light may be emitted from an IR emitter 510.

When a pattern formed on an object 501 is reflected and is captured by a sensor unit 520, a progress direction of the pattern may be already specified and thus, an angle $\theta_1$ may be determined by a shape of the pattern.

An angle $\theta_2$ may also be determined by a position of the pattern on the captured image.

A distance between the IR emitter 510 and the sensor unit 520, that is, a baseline distance I is known and thus a distance d between the sensor unit 520 and the object 501 may be calculated using a function of the angle $\theta_1$, the angle $\theta_2$, and the distance I, for example, $d=f(\theta_1, \theta_2, I)$.

The specific calculation belongs to basic content of a triangulation scheme and thus, further description will be omitted. The sensor unit 520 may generate the depth image using the above scheme.

According to another embodiment of calculating the depth value using the structured light, the IR emitter 510 may generate different IR patterns based on a distance from the IR emitter 510.

In the above embodiment, refraction and interference of light may be used. For example, IR lights emitted from the IR emitter 510 through a plurality of slits or a plurality of holes may be superposed or attenuated along a distance based on a corresponding wave characteristic whereby different patterns may be generated along the distance.

Without a separate calculation process, the sensor unit 520 may calculate the distance from the object 501 through only a pattern shape that is observed on the object 501. Accordingly, when an IR pattern image captured by the sensor unit 520 is analyzed, depth values may be calculated.

Figure 6:
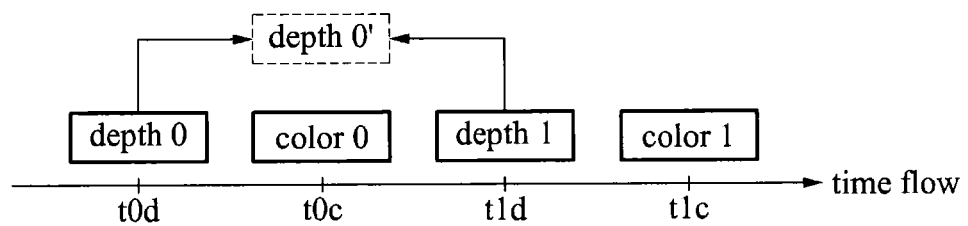
FIG. 6 illustrates a diagram to describe an operation of a color-depth time difference correcting unit according to an embodiment.

FIG. 6 illustrates a diagram to describe an operation of the color-depth time difference correcting unit 340 according to an embodiment.

A depth image and a color image may be alternately obtained over time. Referring to FIG. 6, a depth image (depth 0) is obtained in a time t0d, a color image (color 0) is obtained in a time t0c, a depth image (depth 1) is obtained in a time t1d, and a color image (color 1) is obtained in a time t1c.

Since neither of depth 0 and depth 1 is to be matched with color 0, the color-depth time difference correcting unit 340 may generate a new depth image (depth 0') using depth 0 and depth 1. The above process may be understood as a process of estimating the depth image (depth 0') in the time t0c.

When the time difference is corrected as above, matching may be performed through processing, for example, matching a resolution of depth 0' and a resolution of color 0, and the like. After the matching, a 3D image may be generated. Detailed description is made above with reference to FIG. 3 and thus, further description will be omitted.

Figure 7A:
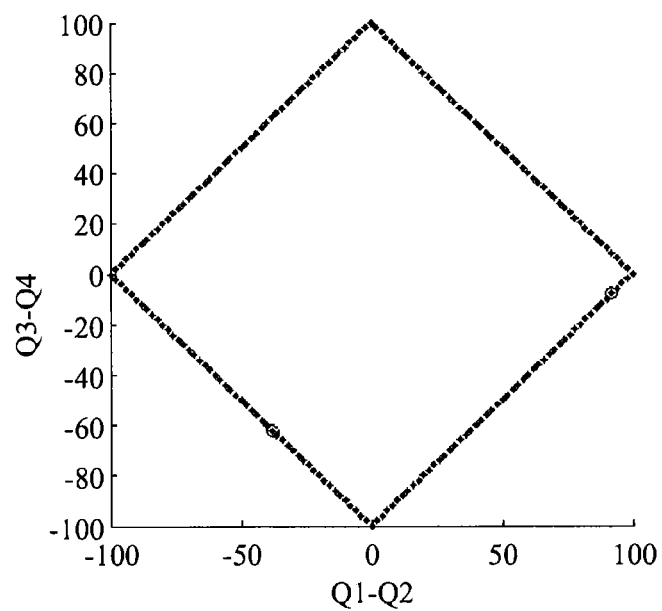
FIGS. 7A and 7B, and FIG. 8 illustrate a diagram to describe a process of detecting and correcting, by a color-depth time difference correcting unit, a motion blur area using a TOF according to an embodiment.
Figure 7B:
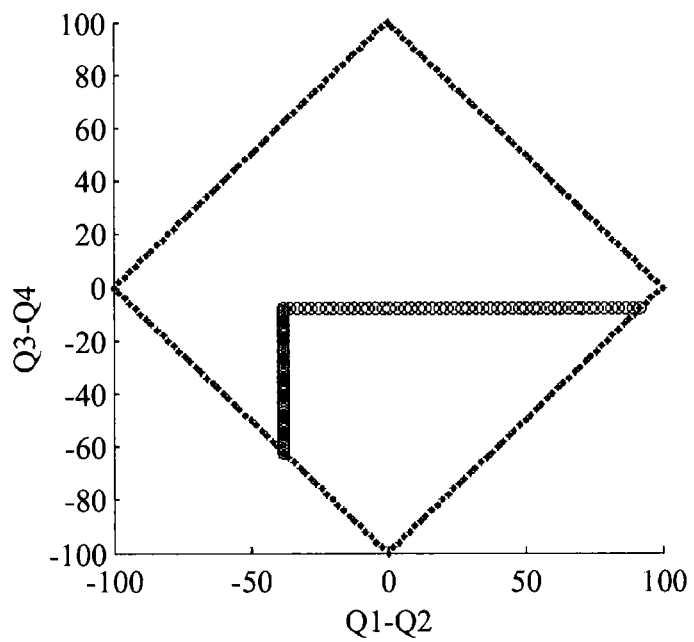
Figure 8:
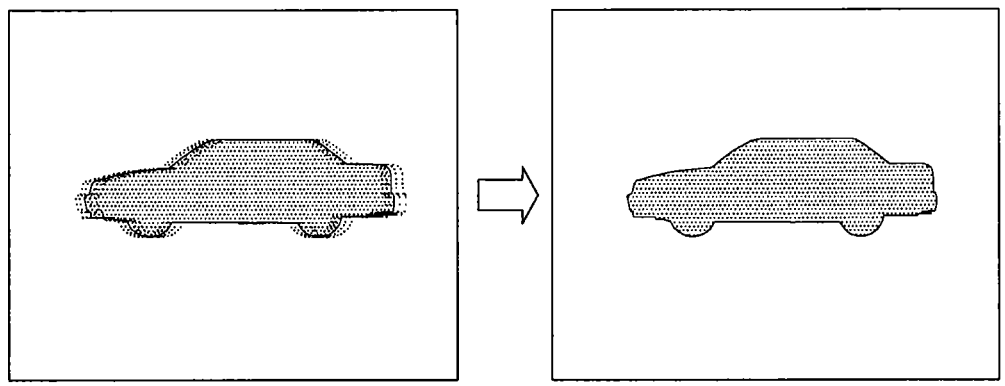

FIGS. 7A and B, and FIG. 8 illustrate a diagram to describe a process of detecting and correcting, by the color-depth time difference correcting unit 340, a motion blur area using a TOF according to an embodiment.

In the TOF, a phase difference between an IR emitted from an IR emitter and the IR reflected from an object may be measured. Measuring of the phase difference may be performed by dividing a period of an IR wavelength into a plurality of time intervals and then measuring an amount of charges. The above content belongs to general TOF camera technology and thus, further description will be omitted.

According to an embodiment, whether a blur has occurred due to shaking of an object or a camera may be determined by performing a phase analysis with respect to a difference between amounts of charges corresponding to different points in times, respectively.

As shown in a graph of FIG. 7A, when a consistent phase characteristic appears on a line, it may indicate that a motion blur has not occurred. As shown in a graph of FIG. 7B, when an inconsistent phase characteristic is observed, a blur may be removed through a phase analysis.

For example, a left image of FIG. 8 shows the presence of a motion blur before the motion blur is removed through a phase analysis. A right image of FIG. 8 shows a result of detecting and correcting, by the color-depth time difference correcting unit 340, a motion blur area using a TOF.

Embodiments of the image processing apparatus 100 corresponding to a depth camera structure using a 1-lens 1-sensor scheme are described above.

Hereinafter, embodiments of a depth and color camera using a 1-lens 2-sensors scheme and a 2-lenses 2-sensors scheme will be described with reference to FIG. 9 and FIG. 10, respectively.

Figure 9:
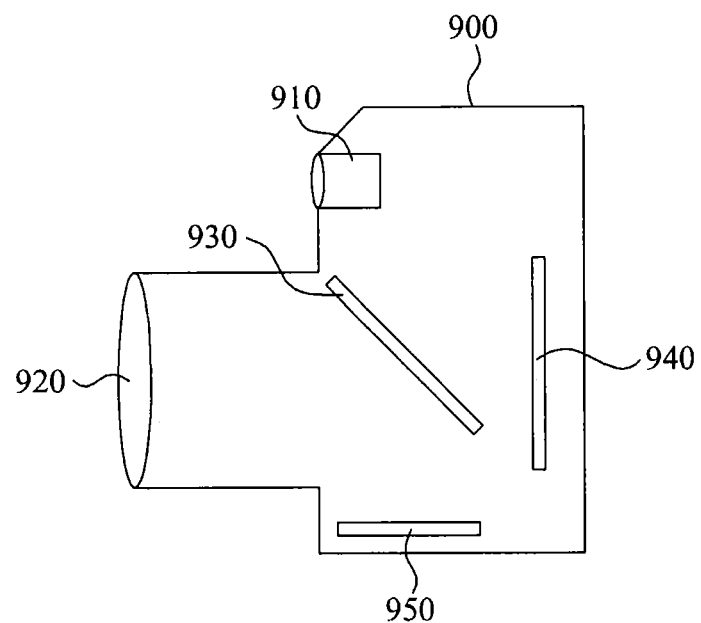
FIG. 9 illustrates an image processing apparatus corresponding to a 1-lens 2-sensors scheme according to another embodiment.

FIG. 9 illustrates an image processing apparatus 900 corresponding to a camera using a 1-lens 2-sensors scheme according to another embodiment.

An IR light emitted from an IR emitter 910 may be reflected from an object and then pass through a lens 920 to reach a translucent mirror 930.

In this case, a portion of the IR light may pass and reach a color sensor 940 whereby a color image may be generated. Another portion of the IR light may reach a depth sensor 950 whereby a depth image may be generated.

Figure 10:
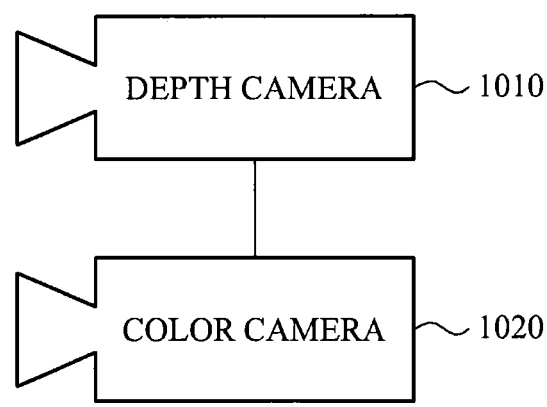
FIG. 10 illustrates an image processing apparatus corresponding to a 1-lens 2-sensors scheme according to still another embodiment.

FIG. 10 illustrates an image processing apparatus corresponding to a camera using a 1-lens 2-sensors scheme according to still another embodiment. In the present embodiment, a depth image may be obtained from a depth camera 1010, and a color image may be obtained from a color camera 1020.

A view difference between the depth camera 1010 and the color camera 1020 may be corrected based on a camera position or direction difference. A transform function or a transform matrix in which panning and zooming between the depth camera 1010 and the color camera 1020 is reflected may be defined. When the transform function is applied to the depth image, a view correction to the color image may be performed.

Further description will be made with reference to FIG. 11.

Figure 11:
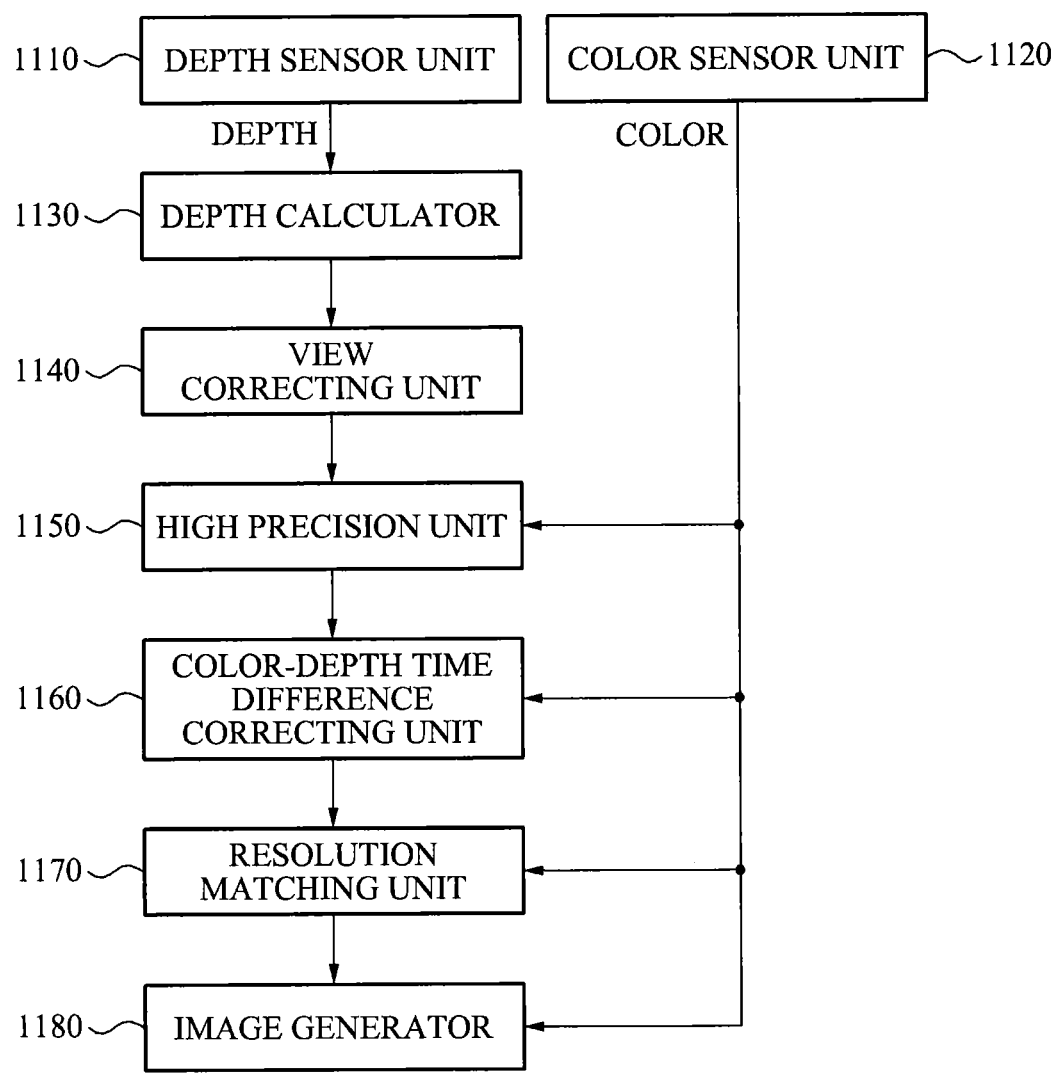
FIG. 11 illustrates a detailed configuration of the image processing apparatuses of FIG. 9 and FIG. 10.

FIG. 11 illustrates a detailed configuration of an image processing apparatus according to the embodiments of FIG. 9 and FIG. 10.

A difference with the embodiments of FIG. 2 and FIG. 3 using the 1-lens 1-sensor scheme lies in that a depth sensor unit 1110 and a color sensor unit 1120 are separately provided.

Operations of the remaining components, for example, a depth calculator 1130, a high precision unit 1150, a resolution matching unit 1170, and an image generator 1180 will be the same as described above with reference to FIG. 2 or FIG. 3.

Here, a view correcting unit 1140 may correct a view difference between a depth image and a color image using a transform function or a transform matrix, which is described above with reference to FIG. 10.

A color-depth time difference correcting unit 1160 may be selectively configured. Theoretically, the depth camera 1010 and the color camera 1020 are synchronized with each other and thus, may simultaneously generate the depth image and the color image, respectively. In this instance, due to various reasons, for example, a minute difference of a shutter release, a reaction speed difference of a sensor with respect to an IR light and a visible light, and the like, the depth image and the color image may be generated at slightly different points in times.

In this case, as described above with reference to FIG. 6 through FIG. 8, the color-depth time difference correcting unit 1160 may correct the difference.

The image processing method and image processing apparatus according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module" or "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The disclosure herein has provided example embodiments of an image processing apparatus and method, which may be applied to obtain a 3D image using an image signal processor, however the disclosure is not so limited to these example embodiments. For example, while the image processing apparatus illustrated in FIG. 4 comprises two IR emitters, the image processing apparatus may have more or less than two IR emitters. Additionally, the image processing apparatus may generate light other than infrared light, and may emit light using a light source other than IR emitter, and may use a laser or light emitting diode, for example.

Thus, although example embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
a sensor unit to generate a color image and a depth image;
a color-depth time difference correcting unit to correct a mismatching that occurs due to a time difference between a point in time when the color image is generated and a point in time when the depth image is generated, wherein the color-depth time difference correcting unit removes a blur occurring due to a motion of the image processing apparatus or an object by performing a phase analysis of the depth image; and
an image generator to generate a three-dimensional (3D) image using the color image and the depth image after the mismatching is corrected.

2. The image processing apparatus of claim 1, further comprising:
a high precision unit to enhance the depth image quality by performing at least one preprocessing process from among a noise cancellation of the depth image, a hole filling of the depth image, or a depth folding removal of the depth image.

3. The image processing apparatus of claim 2, wherein the high precision unit uses color image information when enhancing the quality of the depth image.

4. The image processing apparatus of claim 2, wherein the high precision unit uses an intensity image when enhancing the quality of the depth image.

5. The image processing apparatus of claim 1, further comprising:
a resolution matching unit to adjust a resolution of the depth image after the mismatching is corrected to substantially match a resolution of the color image.

6. The image processing apparatus of claim 1, wherein the color-depth time difference correcting unit corrects the mismatching by generating a new depth image corresponding to a frame in which the color image is generated, using a reference depth image corresponding to a previous frame or a subsequent frame of a frame in which the depth image is generated.

7. The image processing apparatus of claim 1, further comprising one or more light sources to emit light which is reflected from an object and received by the sensor unit,
wherein the sensor unit generates the depth image by calculating depth information which corresponds to light information obtained from the reflected light.

8. The image processing apparatus of claim 7, wherein the sensor unit calculates a distance between the sensor unit and the object using the light information which includes phase difference information.

9. The image processing apparatus of claim 7, wherein the light source generates and emits a coded pattern.

10. The image processing apparatus of claim 9, wherein the generated coded pattern is generated according to a progress direction, and when the coded pattern is formed on the object and reflected, the sensor unit calculates a distance to the object based on a shape of the reflected coded pattern.

11. The image processing apparatus of claim 9, wherein the generated coded pattern is generated according to a distance from the light source to the object, and the sensor unit determines a distance to the object based on an observed pattern shape formed on the object.

12. An image processing apparatus, comprising:
a color sensor unit to generate a color image;
a depth sensor unit to generate a depth image;
a view correcting unit to match a view between the depth image and the color image based on a view difference between the color sensor unit and the depth sensor unit; and
a color-depth time difference correcting unit to correct a mismatching that occurs due to a time difference between when the color image is generated and when the depth image is generated, wherein the color-depth time difference correcting unit removes a blur occurring due to a motion of the image processing apparatus or an object by performing a phase analysis of the depth image.

13. The image processing apparatus of claim 12, further comprising:
an image generator to generate a three-dimensional (3D) image using the view-matched depth image and color image.

14. An image processing method, comprising:
generating, by a sensor unit, a color image and a depth image;
correcting, by a color-depth time difference correcting unit, a mismatching that occurs due to a time difference between a point in time when the color image is generated and a point in time when the depth image is generated, wherein the correcting includes removing a blur occurring due to a motion of the image processing apparatus or an object by performing a phase analysis of the depth image; and
generating, by an image generator, a three-dimensional (3D) image using the color image and the depth image after the mismatching is corrected.

15. The method of claim 14, further comprising:
enhancing, by a high precision unit, the depth image quality by performing at least one preprocessing process of the depth image prior to correcting the mismatching.

16. The method of claim 15, wherein the at least one preprocessing process includes at least one of a noise cancellation of the depth image, a hole filling of the depth image, or a depth folding removal of the depth image.

17. The method of claim 16, wherein the enhancing comprises enhancing the quality of the depth image using color image information.

18. The method of claim 14, further comprising:
up-scaling, by a resolution matching unit, a resolution of the depth image after the mismatching is corrected to substantially match a resolution of the color image.

19. The method of claim 14, wherein the correcting comprises generating a new depth image corresponding to a frame in which the color image is generated, using a reference depth image corresponding to a previous frame or a subsequent frame of a frame in which the depth image is generated.

20. An image processing method, comprising:
   generating, by a color sensor unit, a color image;
   generating, by a depth sensor unit, a depth image;
   matching, by a view correcting unit, a view between the depth image and the color image based on a view difference between the color sensor unit and the depth sensor unit; and
   correcting, by a color-depth time difference correcting unit, a mismatching that occurs due to a time difference between when the color image is generated and when the depth image is generated, wherein the correcting includes removing a blur occurring due to a motion of an image processing apparatus or an object by performing a phase analysis of the depth image.

21. A non-transitory computer-readable medium comprising a program for instructing a computer to perform an image processing method comprising:
   generating, by a sensor unit, a color image and a depth image;
   correcting, by a color-depth time difference correcting unit, a mismatching that occurs due to a time difference between a point in time when the color image is generated and a point in time when the depth image is generated, wherein the correcting includes removing a blur occurring due to a motion of the image processing apparatus or an object by performing a phase analysis of the depth image; and
   generating, by an image generator, a three-dimensional (3D) image using the color image and the depth image after the mismatching is corrected.

22. A non-transitory computer-readable medium comprising a program for instructing a computer to perform an image processing method comprising:
   generating, by a color sensor unit, a color image;
   generating, by a depth sensor unit, a depth image;
   matching, by a view correcting unit, a view between the depth image and the color image based on a view difference between the color sensor unit and the depth sensor unit; and
   correcting, by a color-depth time difference correcting unit, a mismatching that occurs due to a time difference between when the color image is generated and when the depth image is generated, wherein the correcting includes removing a blur occurring due to a motion of an image processing apparatus or an object by performing a phase analysis of the depth image.

23. An image processing apparatus, comprising:
   a color sensor unit to generate a color image;
   a depth sensor unit to generate a depth image;
   a view correcting unit to match a view between the depth image and the color image by applying a transform function to one or more of the depth image and the color image, the transform function being determined based on panning and zooming between the color sensor unit and the depth sensor unit; and
   a color-depth time difference correcting unit to correct a mismatch that occurs due to a time difference between when the color image is generated and when the depth image is generated, wherein the color-depth time difference correcting unit removes a blur occurring due to a motion of the image processing apparatus or an object by performing a phase analysis of the depth image.

* * * * *